Nov. 6, 1923.

A. W. KETTLE ET AL 1,472,870

SHOCK ABSORBER

Filed Nov. 6, 1922

Inventors
Arthur W. Kettle
Allan A. Thayer

By Clarence S. Walker
Their Attorney

Nov. 6, 1923.

A. W. KETTLE ET AL 1,472,870

SHOCK ABSORBER

Filed Nov. 6, 1922 2 Sheets-Sheet 2

Inventors
Arthur W. Kettle
Allan A. Thayer

By Clarence S. Walker.

Their Attorney

Patented Nov. 6, 1923.

1,472,870

UNITED STATES PATENT OFFICE.

ARTHUR W. KETTLE AND ALLAN A. THAYER, OF JAMESTOWN, NEW YORK, ASSIGNORS TO AUTO SPRING CONTROL COMPANY, INC., OF JAMESTOWN, NEW YORK, A CORPORATION OF NEW YORK.

SHOCK ABSORBER.

Application filed November 6, 1922. Serial No. 599,214.

*To all whom it may concern:*

Be it known that we, ARTHUR W. KETTLE and ALLAN A. THAYER, citizens of the United States, residing at Jamestown, in the county of Chautauqua and State of New York, have invented certain new and useful Improvements in Shock Absorbers, of which the following, taken in connection with the accompanying drawings, is a specification.

This invention relates to an improvement in shock absorbers for vehicles, self-propelled or otherwise, and more particularly to shock absorbers of the hydraulic type in which the shocks are resisted by fluid confined in a chamber from which it escapes through a regulated opening.

The primary object of this invention is the provision of a simple and durable hydraulic construction comprising a casing having a fluid reservoir in its upper portion in combination with a cylinder having a double-ended piston mounted therein to the different portions of which cylinder the fluid in the reservoir has access through and around said piston, said piston being provided with spring controlled valves in each end which thereby provide passage for the liquid when the piston moves in one direction and safety valves which ensure against breakage of the shock absorber parts, and more particularly the piston actuating lever or arm. Moreover, the cylinder is also provided with side passages or by-passes which connect the opposite ends of the cylinder with the center of the cylinder, said by-passes being adjustably controlled by means of screw valves from the exterior of the casing, the movement of the liquid within the casing being thus regulated so as to cushion the movement of the piston toward each end and consequently retard the movement of the body of the vehicle to and fro from its chassis, which movements cause the travel of the piston in the cylinder; thereby reducing the shock effects arising from rough and uneven roads.

Other objects will appear from an examination of the following description taken in connection with the accompanying drawings which form a part thereof and in which:

Fig. 1 is a side elevation of a shock absorber embodying this invention attached to the frame or body of a vehicle and connected to the axle thereof, a portion of the actuating lever being broken away to show parts of the casing that would otherwise be hidden.

Fig. 2 is a crosswise sectional view at line 2—2 in Figs. 4 and 5 showing the improved construction and arrangement of the parts.

Fig. 3 is a sectional view at line 3—3 in Figs. 4 and 5, showing the elevation of the piston head with the ball valve therein and the fluid chamber in the upper portion of the casing.

Figure 4:
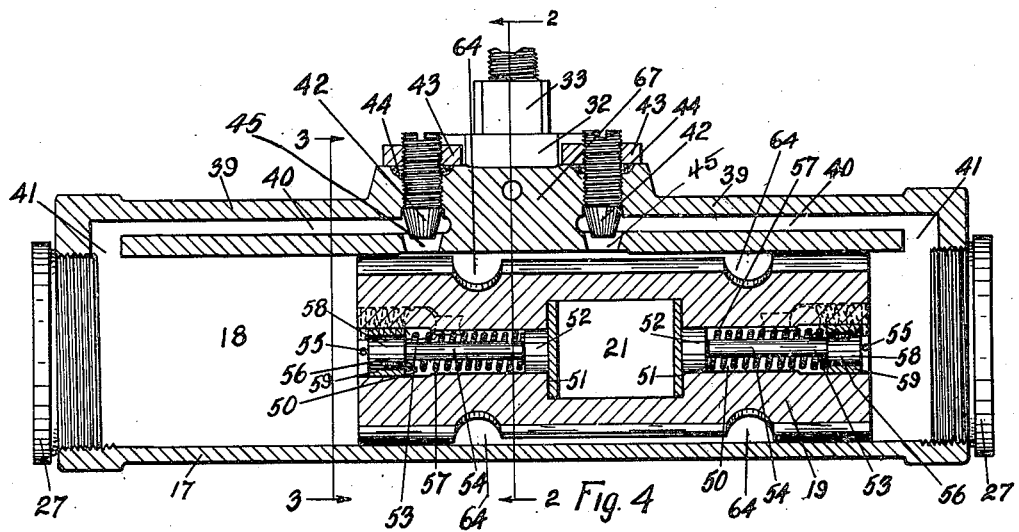
Fig. 4 is a lengthwise diametral view of the cylinder portion of the housing at line 4—4 in Fig. 3.

Referring to the drawings the numeral 10 is used to designate a vehicle axle, which is connected by a spring 11 to the chassis or frame 12 of the vehicle.

The shock absorber housing 13 is attached to the side of the chassis or frame 12 by suitable bolts 14 through passages 141 formed in the casing at each end of the upward projection 15 which forms the housing for the fluid reservoir 16. The attaching bolts 14 in this position do not come in contact with the other mountings of the car when the shock absorber 13 moves with the vehicle body.

That portion 17 of the shock absorber 13 from which the housing projects is cylindrical and contains the cylinder 18 therein within which the double-headed piston 19 reciprocates. The upper side of the piston 19 is cut away at the center to form a curved cavity 20 from which a rectangular passage 21 extends through the piston. The cavity 20 is shaped to permit the oscillation of the piston arm 23, the cam-shaped end 22 of which enters the passage 21. The piston arm 23 has a squared or hexagonal-shaped opening 24 in which seats the hexagonal portion 25 of the shaft 26, which shaft 26 extends across the fluid reservoir 16.

The reservoir 16 in the upper portion of the housing serves to hold and supply oil or fluid over the central portion of the cylinder 18, thereby constantly keeping said cylinder filled with oil so that all parts work in oil. At each end of the cylinder 18 is a screw plug 27 by which access is given to the cylinder and through which the housing 13, which includes the cylinder 18 and the reservoir 16 connected thereto, is filled.

One end of the crosswise shaft 26 is preferably mounted in the journal 29 in the boss 28 projecting from one wall of the reservoir 16 while the other end extends out through the screw plug or gland bushing 30 with its stuffing box and packing 31 and gland 32 which securely closes said stuffing box and provides a tight joint around the shaft 26 to hold the oil within the reservoir 16. The outer end 33 is squared adjacent to the gland 32 to receive thereon the end of the connecting arm or lever 34 which extends out to the link 35 which is connected to the axle 10 by means of the clip 36. The link 35 preferably has a ball and socket connection to the arm 34 at its upper end and to the bracket clip 36 at its lower end and is threaded in order to adjust the end caps 37 and 38, thereby controlling the position of the arm 34 which should be approximately horizontal.

The housing 13 preferably has a lengthwise enlargement or projection 39 extending along one side from each end of the cylindrical portion 17 to the center portion, as shown in Fig. 4, to provide for the by-passes or side passages 40. Each of the passages 40 extend from the outer end of the cylinder 18 to which they are connected by passages 41 at their outer ends to the center of cylinder. Conical valves 42 at the inner ends of the passages each side of and a little lower than the shaft 26, as shown in Fig. 1, control the flow of the fluid through the passages 41. The conical screw valves 42 each have the lock nuts 43 and the small stuffing box and packing 44 to prevent oil leakage. The valves 42 each seat in the passages 45 which open into the centrally enlarged portion of the cylindrical opening 18 around the double piston 19 so that the valves 42 can thus close or partly close the by-passes 40, as desired, to control the flow of the fluid.

The double headed piston 19 has passages 46 leading from the central cavity 20 to the outer lengthwise faces of the pistons. These passages are normally closed by the spring ball valves 47 which open as the piston is retracted to admit fluid to the relieved end of the cylinder thus supplementing the supply through the passage 41. The valve 47 at the working end of the piston, however, seals the passage 46 the action of the spring 48 on the ball 49 being aided by the pressure of the compressed fluid.

Below the passages 46 are passages 50 which lead from the sides of the opening 21 in the piston to the outer faces of the piston At the inner ends of the passages 50 are provided steel shims 51 having projections 52 which enter and seal the passages 50. These shims are provided to receive the wear of the cam shaped end 22 of the piston arm as it reciprocates the piston. It will be noted that the passage 21 and the shims 51 are so made with relation to the cam shaped end 22 that there is no lost motion but merely an oscillatory rotary movement.

The outer ends of the passages 50 are enlarged to receive the heads of the plunger valves 53. The stems 54 of the valves 53 rest against the projections 52 of the shims and cross pins 55 are provided at the outer end of each passage 50 to limit the movement in that direction. Encircling the stems 54 of the valves and bearing against the projections 52 and valve heads 56 are coil springs 57.

The head 56 of the valve is made in two parts, an inner head 58 which is preferably integral with the stem 54, and a sleeve or collar 59 which fits closely around the inner head 58. In the inner head 58 is cut an inclined slot 60 which terminates short of the outer face of the head and is thus normally closed by the sleeve 59 under the compression of the spring 57. Leading at an angle from each passage 50 to the cavity 20 is an inclined passage 61.

Under normal conditions the shock transmitted to the shock absorber can be taken up without danger and the springs 57 are made of sufficient strength to hold the sleeves 59 over the slots 60 without any yield at all or only a slight one which will not uncover the slot. There may, however, be unusually hard shocks which, unless some relief be granted, will do injury to the parts of the absorber particularly the arm 23 and under such conditions the spring 57 on the working end of the piston will yield so that the sleeve 59 will uncover the slot 60 and permit a portion of the fluid to escape to the cavity 20 through the passage 61. If the danger continues to exist the sleeve 59 will be pushed back still further uncovering more of the slot 60 and thus allowing a greater flow to the cavity. The sleeves 59, the notches 60 and the passages 61 thus act as safety valves and protect the moving parts of the absorber from the result of very sudden or severe shocks.

The intermediate portion of the piston 19 between the heads 62 and 63 is relieved and a peripheral notch 64 is provided so as to permit free passage of the fluid around the moving parts. A well 65 is also formed in the cylinder wall through which the end of the arm 23 passes upon each oscillation.

It is now apparent that the piston 19 is moved from one end toward the other by the movement of the axle 10 and spring 11, said movement being transmitted to the piston by the link 35 and lever arm 34, thereby turning the shaft 26 and actuating the piston arm 23 to reciprocate said piston 19. The fluid with which the cylinder 18 and reservoir 16 is filled is pressed by the movement of the piston 19 toward the center of the cylinder 18, the ball valve 47 of the working end of the piston being closed and the oil forced through the passages 41 and 40 into the central cavity 20 and reservoir 16. The screw valves 42 are adjusted to give the proper impedance to the fluid as it is forced through said passages.

It is apparent also that in our improved construction the fluid also passes freely down through the passage 46 and ball valve 27 of the non working end of the piston as well as through the passages 40 and 41 after said fluid reaches the central cavity within said cylindrical cavity 18. The valves 42 are preferably made sufficiently large and strong to be durable and easily adjustable.

One of the offices of the shock absorber is to control the resilient movement of the body of the vehicle and its supporting frame 12 in relation to the axle 10. The double headed piston 19 and valvular controlled, fluid-filled cylindrical construction controls the action of the spring 11 and body 12 except where the spring 11 is weak or too weak to properly support the load thereon, in which case the action of said spring may be stiffened by adjusting the control valves 42 for the fluid in the shock absorber.

In driving over rough pavements or roads, the gland 32 may be loosened by constant joggling shocks. Accordingly, it is preferred that said cap or gland 32 be made hexagonal and a locking pin 66 be provided which is threaded in the fin 67 between the valves 42 and which bears against one face of the cap. Any fluid of low viscosity will attain our purpose, but the fluid preferred for the shock absorber is an oil which remains as nearly normal as possible under all temperatures so that the shock absorber will act substantially the same under extreme cold temperatures or excessive heats. However, a slight turn of the conical screw valves 42 will adjust to any temperature.

The valve seat opening 45 and passages 40 and 41 are sufficiently large to permit a free discharge of the fluid as it cushions the piston head, and the passages 46 in the piston also give a direct opening through which the oil or fluid discharges. This free and direct discharge of the fluid eliminates the frictional heat of the fluid and consequent deterioration. The size of each of the safety or relief valve passages 61 and the slots 60 as well as the size of the passages 46 are so balanced to the pressure of the cylinder 19 on the oil or other fluid as to render the shock absorber resilient or flexible in its action since it permits the escape of a sufficient portion of the non-compressible liquid to relieve the shock pressure of the piston on the parts of the shock absorber, particularly the arm 34 and link 35 so as to fracture the same, yet holds the retarding pressure firmly upon the spring action in its relation to the body of the vehicle and thereby attains the desired absorption of the shocks.

Figure 5:
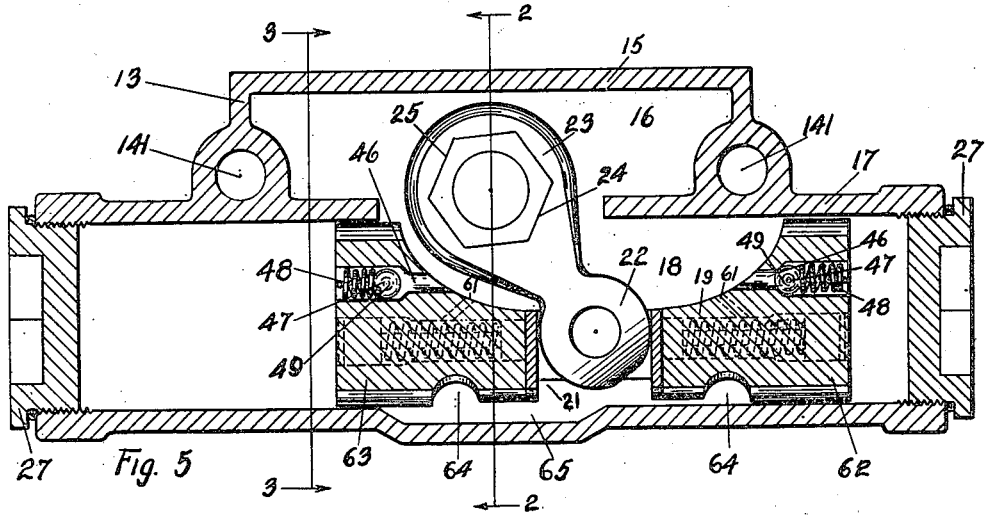
Fig. 5 is a lengthwise sectional view at line 5—5 in Fig. 3 the piston arm and the shaft therefore being shown in elevation.
Figure 6:
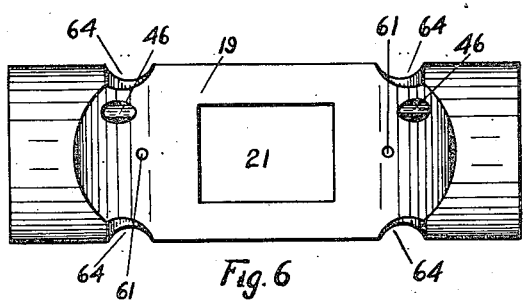
Fig. 6 is a detail perspective view of the double headed piston removed from the cylinder and showing the square opening therein for the end of the piston arm and the valve openings for each end and Fig. 7 is a detail cross sectional view of one of the safety valves.
Figure 7:
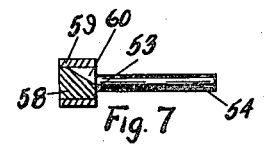

When the shock absorber is mounted upon the vehicle frame the end caps 37 and 38 are adjusted so that the arm 34 is approximately horizontal. The valves 42 are then regulated so that in conjunction with the relief valves 53, the device will absorb any shocks to which the vehicle may be subjected. Referring particularly to Figs. 4 and 5 it will be observed that when the needle valves 42 are properly adjusted a slight shock will be absorbed by the escape of the fluid confined in front of the working head of the piston through the passage 40. If, however, a shock is received which is so great that the liquid cannot escape quickly enough through the passage 40 the confined liquid presses against the sleeve 59 of the relief valve 53 and forces it back against the tension of the spring 57 until the slot 60 is uncovered. This slot increases in depth so that as the sleeve 59 is forced back the passage through which the liquid may escape increases. Hence the sleeve will travel only so far as is necessary to relieve the conditions. The amount of travel of the sleeve depends, not only upon the amount of shocks to be absorbed, but also upon the viscosity of the oil which may be employed as fluid.

The valves 53 thus act in conjunction with the needle valve 42 so that shocks of all intensities are absorbed. Since the needle valves 42 are set the variances in intensity of the shocks cause the relief valves to function as above pointed out. Thus it will appear that the valves 53 are properly designated as auxiliary relief valves. A further function of these auxiliary relief valves is to permit the device to take care of change in viscosity of oil. This viscosity increases as the temperature decreases and consequently at a lower temperature oil will flow more sluggishly than at a higher temperature. Hence a shock, which, when the oil is warm, will cause the auxiliary valve to function only slightly or not at all, will, when the oil is cold, cause the auxiliary valve to function more, forcing the sleeve 59 back farther and uncovering more of the slot 60. It will follow, therefore, that after the needle valves 42 are set any variance in the work put upon the shock absorber, whether due to the shocks to be absorbed or a change in the viscosity, will be taken care of by the auxiliary valves 53 without any further adjustment of the valves 42.

While one embodiment only has been shown and described we are not to be limited thereto since it is obvious that other embodiments may be made without departing from the spirit and scope of the invention as set forth in the following claims.

Having thus set forth our invention what we claim as new and for which we desire the protection of Letters Patent, is as follows:

1. A shock absorber comprising a cylinder, said cylinder having a by-pass for fluid from each of its outer ends to a central portion, a double headed piston reciprocatively mounted in a cylinder to cushion on the fluid therein, said piston having passages through each of its heads for the fluid, and relief valves independent of said passages.

2. A shock absorber comprising a cylinder, said cylinder having a by-pass for fluid from each of its outer ends to a central portion through valve controlled openings, adjustable valves to regulate the size of said valve openings, a double headed piston reciprocatively mounted in said cylinder to cushion on the fluid therein, and an automatic relief valve in each of the heads of said piston.

3. In a shock absorber, a cylinder, a double headed piston in said cylinder having a central cavity therein, said piston having passages through each of its heads to said central cavity, a valve in each of said passages automatically controlled by fluid pressure, said cylinder having a by-pass from each of its opposite ends to said central cavity, and an adjustable valve in each of said by-passes to control the flow of the fluid therethrough.

4. In a shock absorber, a cylinder, a double headed piston in said cylinder having a central cavity therein, said piston having passages through each of its heads to said central cavity, a valve in each of said passages automatically controlled by fluid pressure, a safety valve in each head of said piston leading to said central cavity, said cylinder having by-pass from each of its opposite ends to said central cavity, and an adjustable valve in each of said by-passes to control the flow of the fluid therethrough.

5. In a shock absorber, a cylinder having an enlarged central cavity, said cylinder having a by-pass connecting each of its opposite ends to said central cavity, an adjustable valve in each of said by-passes to control the flow of the fluid therethrough, a double headed piston in said cylinder having a central cavity therein, said piston having passages extending through each of its heads to said central cavity, and a ball valve in each of said passages automatically controlled by the fluid pressure to open and close the same as said piston is reciprocally actuated.

6. In a shock absorber, a cylinder having a central reservoir, said cylinder having a separate by-pass connecting each of its opposite ends to said central reservoir through a valve seat opening from each of said by-passes to said central reservoir, an externally adjustable screw valve seating in each of said valve seat openings to control the flow of the fluid therethrough, a double headed piston reciprocatively mounted in said cylinder having a central cut-away portion to form part of said reservoir, said piston having passages through each of its heads connecting to said central cut-away portion, and a ball valve in each of said passsges in said piston heads to automatically open and close by fluid pressure as said piston is reciprocally actuated.

7. In a shock absorber, a cylinder having a reservoir central of its upper side to fill said cylinder, said cylinder having by-passes connecting each opposite end to the central portion through a valve seat opening each side of said reservoir, an externally adjustable conical screw valve seating in each valve opening to control the flow of the fluid therethrough, a double headed piston in said cylinder having a central cut-away portion, a piston arm shaped to be received in said cut-away portion of said piston to reciprocally actuate the same, a shaft journaled crosswise of said fluid chamber to reciprocally actuate said piston arm and piston, said piston having passages through each of its heads for the fluid, a ball valve in each of the piston head passages to automatically control the flow of the fluid therethrough, and an arm attached to said shaft and connected to the axle of the vehicle to reciprocally actuate said piston by the movement upward or downward of the vehicle body.

8. In a shock absorber, having a cylindrical chamber, a double headed piston reciprocable in said chamber, a safety plunger valve in each of said pistons, said valve having an inner valve head, a sleeve surrounding said head, and said head having an inclined slot therein normally covered by said sleeve.

In testimony whereof they have affixed their signatures.

ARTHUR W. KETTLE.
ALLAN A. THAYER.